United States Patent Office 3,065,170
Patented Nov. 20, 1962

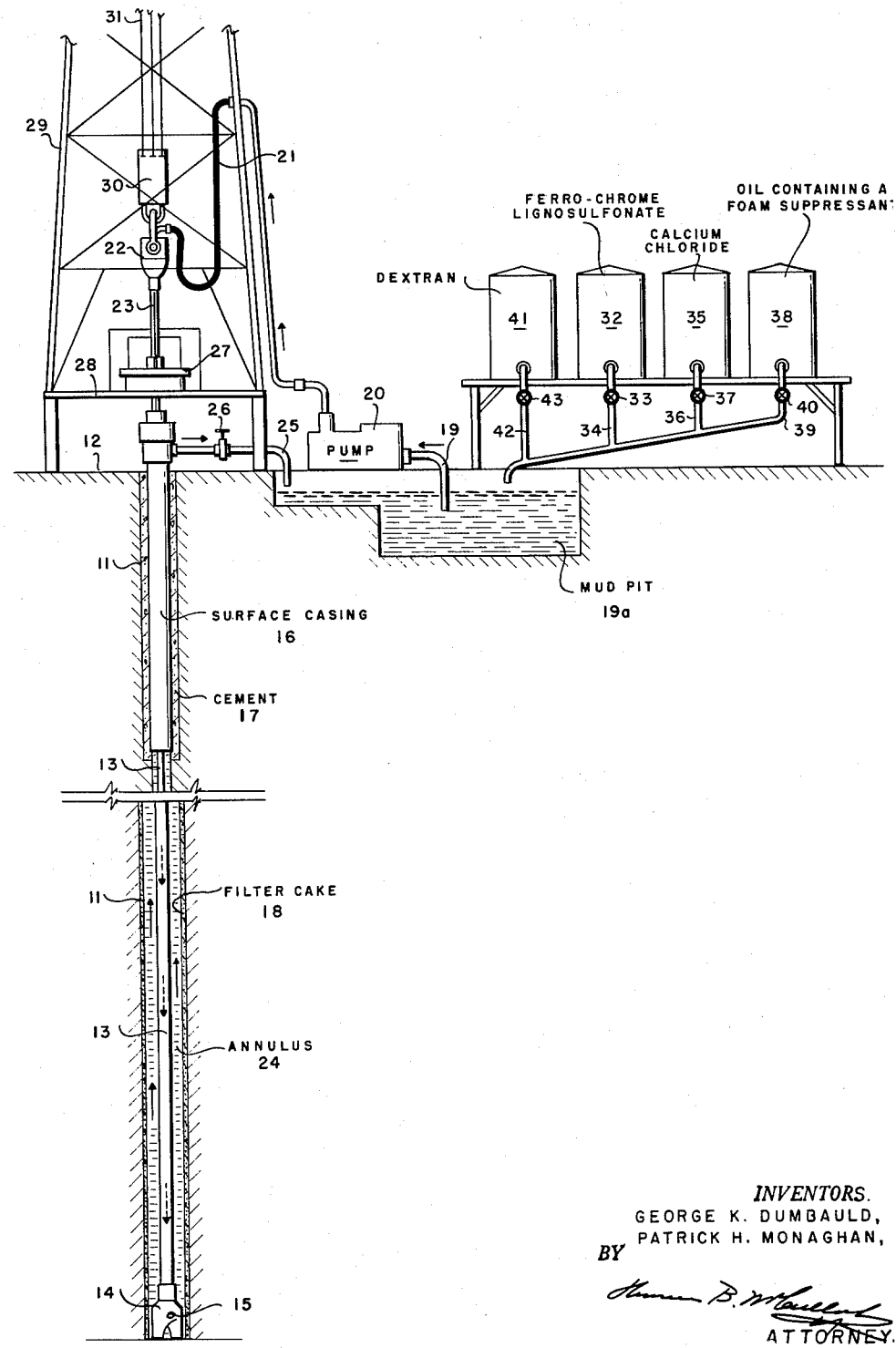

3,065,170
DRILLING FLUIDS FOR USE IN WELLS
George K. Dumbauld and Patrick H. Monaghan, Bellaire, Tex., assignors, by mesne assignments, to Jersey Production Research Company, Tulsa, Okla., a corporation of Delaware
Filed July 2, 1959, Ser. No. 824,628
16 Claims. (Cl. 252—8.5)

The present invention is directed to a fluid for use in wells. More particularly, the invention is directed to a drilling fluid which has improved properties at elevated temperatures. In its more specific aspects, the invention is directed to a composition for use in and a method of drilling wells.

The present invention may be briefly described as a composition suitable for use in wells. The composition comprises a suspension of clay and an aqueous solution containing a water-soluble salt of an alkaline earth metal. The alkaline earth metal salt is employed in a sufficient amount to provide in the composition an amount of alkaline earth metal ion of at least 1800 p.p.m. The composition also contains sufficient amounts of ferrochrome-lignosulfonate and dextrain to provide the composition with an API filtration rate less than about 20 ml. The composition has a pH in the range from about 7.5 to about 10 and density from about 8 to about 18 pounds per gallon.

The invention also involves drilling a well in which a composition in accordance with the present invention is employed in which the fluid is formed and then introduced and circulated in the well during drilling operations whereby after exposure to elevated well temperatures the filtration rate of the fluid is not affected adversely.

In the practice of the present invention, it is contemplated that the clay will be employed in an amount within the range from about 7 to about 70 pounds per barrel. Preferably, the clay is a bentonitic clay but other clays such as illites, calcium and sodium montmorillonites, zeolites, attupulgites, natural clays, and the like may be used.

The presence of at least a portion of the ferrochrome-lignosulfonate is essential in the practice of the present invention and amounts within the range from about 5 to about 20 pounds per barrel are employed. The ferrochrome-lignosulfonate must be added to the suspension of clay in fresh water prior to the addition of the water-soluble salt of the alkaline earth metal and must be added to the clay suspension after it is made up rather than to the ingredients of the water-clay suspension.

Some water-soluble salts of the alkaline earth metals are the chlorides, bromides, iodides, nitrates, acetates, formates, and organic salts. Illustrative of other water-soluble alkaline earth metal salts may be mentioned calcium chromate, barium chromate, barium permanganate, calcium permanganate, and the like.

The particular alkaline earth metals employed in the present invention are calcium, magnesium, barium, and strontium. It is contemplated that the alkaline earth metal ion will be present in the improved drilling fluid in a sufficient amount to provide at least about 1800 p.p.m. with a suitable upper limit of about 40,000 p.p.m. Above a concentration of about 40,000 p.p.m. the desired fluid properties show deterioration while below about 1800 p.p.m. the fluid does not possess the desired characteristics. For calcium and the other salts besides magnesium, the alkaline earth metal ion may be present in amounts of at least 2000 p.p.m.

It is specifically contemplated that the water-insoluble or the slightly water-soluble salts of the alkaline earth metals will not be employed. Thus, it is contemplated that the sulfates, carbonates, and phosphates may not be used in the practice of the present invention. Likewise, the hydroxides such as calcium hydroxide are not employed in this invention.

It is contemplated in the practice of the present invention that the drilling fluid may have a density in the range from about 8 to about 18 pounds per gallon. To achieve this density, weighting agents such as barites, which is barium sulfate, barium carbonate, ferric oxide, lead oxide, galena, and other inorganic and/or organic compounds may be employed.

While the suspension is preferably a suspension of clay in fresh water, it is contemplated in the practice of the present invention that an oil-emulsion suspension may be used.

The pH of the drilling fluid is within the range from about 7.5 to about 10 with a pH of about 8 to 9 being preferred for best results.

In the present invention dextran is added with the ferrochrome-lignosulfonate, the dextran being employed in amounts from about 1 to about 10 pounds per barrel such that the ferrochrome-lignosulfonate and dextran allow the obtaining of a drilling fluid having the desired filtration characteristics when used at elevated temperatures. The ferrochrome-lignosulfonate and dextran may be in a ratio from about 5:1 to about 0.5:1.

Dextran is a gummy carbohydrate found in the unripe sugar beet and formed in sugar solutions, wines, etc. by bacterial action. Dextran is sometimes also called fermentation gum. Dextran is also a term applied to carbohydrate slimes originating from sugar syrups and it is found in crystallizing tanks of sugar refineries and also results from fermenting vegetables and dairy products. Dextran has an empirical formula of

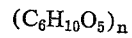

$$(C_6H_{10}O_5)_n$$

Dextran is a linear glucose polymer in which the terminal units of one chain are in chemical union with members of adjacent chains to form a network structure. Dextran, as used in the present invention, is used in the sense as described by Evans, Hibbert in Advances in Carbohydrate Chemistry, vol. II, p. 209 (1946), and by Fairhead, Hunter, Hibbert, Can. J. Res. B 16, 151 (1938), and Peat, Schluchterer, Stacey, J. Chem. Soc., 1939, 581.

It is contemplated in the practice of the present invention that during the course of drilling operations it may be desirable to add oil in an amount from about 5% to about 15% by volume too the drilling fluid to improve circulation and lubrication. When oil is added, it may be desirable to employ a foam-suppressing agent. The types of oil finding use in the practice of the present invention are oils having a viscosity from about 1.5 to about 200 centipoises at 70° F. Kerosene, gas oils, and the like are satisfactory.

As a foam-suppressing agent, the fatty acid metal soaps are desirable and exemplary of foam-suppressing agents useful in the present invention are the calcium, magnesium, aluminum and lead salts of stearic, oleic and palmitic acids. Aluminum stearate has been found to give effective results as a foam suppressor.

The present invention will be further illustrated by reference to the drawing in which the single figure illustrates a drilling operation employing a preferred mode of the present invention.

Referring now to the drawing, numeral 11 designates a well bore drilled from the earth's surface 12 by rotating a drill string 13 carrying on its lower end a drill bit 14 which may be a rock bit or one of the fishtail type. The drill bit 14 is provided with the usual circulation port or ports 15 through which the drilling fluid is circulated into the well.

Lining the upper portion of the well bore 11 is a surface casing 16 which is cemented in place with cement 17.

By virtue of using the present invention, a filter cake 18 is formed on the walls of the well bore 11 by deposition of mud from the drilling fluid.

Drilling fluid from the pit 19a is drawn by pump 20 through line 19 and discharged through flexible line 21 into drill stem 13 by way of swivel 22 and kelly-joint 23. The fluid circulates down the drill string 13 as indicated by dashed arrows, out the ports 15 in drill bit 14, up the annulus 24 and by way of line 25, controlled by valve 26, back into mud pit 19a.

The drill stem 13 is rotated by means of a rotating table 27 on the floor 28 of the derrick 29. The drill stem is supported by means of block 30 and lines 31.

After initial drilling operations have commenced and proceeded with a fresh-water clay, the condition of the well bore may indicate the desirability of empolying the present invention. To this end the fresh-water clay drilling fluid in the mud pit 19a and in the bore hole 11 is converted by adding to it a sufficient amount of ferrochrome-lignosulfonate to provide a fluid loss less than about 20 ml. API in the final fluid. This is suitably accomplished by discharging into mud puit 19a from tank 32 a sufficient amount of ferrochrome-lignosulfonate by opening valve 33 in line 34. The ferrochrome-lignosulfonate may be added as a solid. After the ferrochrome-lignosulfonate has been incorporated in the drilling fluid in mud pit 19a, calcium chloride is then introduced thereto from tank 35 through line 36 by opening valve 37, the ingredients of the mud pit being vigorously agitated by a mud mixer or other mixing or circulating means. The calcium chloride may suitably be added as a solid in the dry condition. Drilling operations are continued by circulating drilling fluid withdrawn by line 19 by pump 20 down the drill string 13 out through the ports 15 and up the annulus 23 and returned to the mud pit 19a by line 25.

Alternatively, the ferrochrome-liguosulfonate and calcium chloride both may be added as a solid simultaneously while continuing circulation from pit 19a down the drill string 13 or sequentially with the dry ferrochrome-lignosulfonate first and the dry calcium chloride next. Simultaneous addition is preferred in field practice. To achieve this the ferrochrome-lignosulfonate and calcium chloride may be added through a hopper, not shown, in sequence, or in solid mixture.

It may be desirable at this point to introduce into the mud pit from tank 38 by line 39 controlled by valve 40 an amount of oil, in the range indicated before containing a foam suppressing agent, to improve the fluid properties.

After the fresh-water drilling fluid has been converted to a drilling fluid containing at least 1800 p.p.m. of alkaline earth metal ion, there is then added to the drilling fluid in mud pit 19a a sufficient amount of dextran in the range given previously from tank 41 through line 42 by opening valve 43. The admixture in mud pit 19a is agitated and then picked up by pump 20 and circulated down the drill string 13 as has been described.

Employing a drilling fluid containing ferrochrome-lignosulfonate and dextran allows drilling to proceed without interruptions in wells encountering elevated temperatures. For example, the composition of the present invention resists the effect of temperatures on filtration properties. A composition in accordance with the present invention has been aged for 185 hours at 180° F. with only negligible effects on the drilling mud. In other words, in the practice of the present invention, the drilling mud may be used over a long period of time at the high temperatures maintained in the well which may range from about 100° to about 350° F.

EFFECT OF FILTRATION CONTROL AGENTS ON MUDS AGED AT 80° F.

| Mud | Dextran, Lb./Bbl. | | | Driscose, Lb./Bbl. | Du Pont DM-NaCMC, Lb./Bbl. | | Guar Flour, Lb./Bbl. | | | Qualex Hi Vis CMC H-16, Lb./Bbl. | | | Diacel LWL, Lb./Bbl. | |
|---|---|---|---|---|---|---|---|---|---|---|---|---|---|---|
| | 1 | 2 | 4 | 2 | 2 | 4 | 1 | 2 | 4 | 1 | 2 | 4 | 2 | 4 |
| A(35)[1] | 16.5 | 9.8 | 6.8 | | 20.6 | 11.2 | 37.1 | 15.5 | 14.4 | 20.0 | 10.6 | 5.6 | 29.0 | 8.0 |
| C(64) | 20.1 | 9.4 | 5.4 | | | | | | | | | | | |
| D(8.6) | 5.2 | 3.3 | | | 6.5 | 5.0 | | | | | | | | |
| F(29.6) | | 8.3 | | 10.8 | | | | | | | | | | |
| G(14.6) | | 3.8 | | 3.6 | | | | | | | | | | |
| H(11.6) | | 3.4 | | | | | | | | | | | | |
| I(47) | | 12.7 | | 17.0 | | | | | | | | | | |
| J(18.2) | | 6.3 | | | | | | | | | | | | |

EFFECT OF FILTRATION CONTROL AGENTS ON MUDS AGED AT 180° F.

| | 1 | 2 | 4 | 2 | 2 | 4 | 1 | 2 | 4 | 1 | 2 | 4 | 2 | 4 |
|---|---|---|---|---|---|---|---|---|---|---|---|---|---|---|
| B'(52) | 24.4 | 14.6 | 8.0 | | 43.0 | 28.0 | 46.5 | 38.5 | 14.5 | 40.5 | 27.5 | 9.4 | | |
| C'(62.5) | 28.7 | 23.0 | 7.2 | | | | | | | | | | | |
| D'(11.2) | 5.7 | 4.0 | | | 5.2 | | | | | | | | | |
| F'(31.8) | | 10.3 | | 17.3 | | | | | | | | | | |
| G'(19.2) | | 4.0 | | 5.2 | | | | | | | | | | |
| H'(12.6) | | 3.7 | | | | | | | | | | | | |
| I'(37) | | 15.4 | | 25.6 | | | | | | | | | | |
| J'(—) | | 8.0 | | | | | | | | | | | | |

[1] Filtration rate of untreated mud.

Mud A—10 lb./bbl. Green Band Clay (a low yield clay), 6 lb./bbl. Ferrochrome-lignosulfonate, 3,000 p.p.m. Ca ion (CaCl²).
Mud B'—Same as A but aged at 180° F.
Mud C—Same as A weighted to 16.2 lb./gal. with barites.
Mud C'—Same as C but aged at 180° F. for 7 days.
Mud D—High calcium field mud from drilling well—weight 11.3 lb./gal.
Mud D'—Same as D but aged at 180° F.
Mud F—Alkaline-tannate mud converted to high calcium ion mud—11.0 lb./gal.
Mud F'—Same as F but aged at 180° F.
Mud G—Same as F weighted to 15.0 lb./gal. with barites while drilling.
Mud G'—Same as G but aged at 180° F.
Mud H—Field mud converted to high calcium ion mud and weighted to 16.5 lb./gal. with barites.
Mud H'—Same as H but aged at 180° F.
Mud I—Same as H contaminated with cement and diluted to 9.8 lb./gal.
Mud I'—Same as I but aged at 180° F.
Mud J—Field mud converted to high calcium ion mud while drilling—11.3 lb./gal.
Mud J'—Same as J but aged at 180° F.

In order to illustrate the present invention further, a number of mud compositions was prepared and the API filtration rate of these several compositions determined. In one case dextran was added to the high calcium ion drilling fluid containing ferrochrome-lignosulfonate. In another case Driscose (which is a technical grade of sodium carboxylmethyl cellulose marketed by Drilling Specialties, Inc.) was employed instead of the dextran. In another case sodium salts of carboxymethyl cellulose from the Du Pont Company and designated DM-Na CMC were employed. In still another operation Guar flour, which is a polysacchride consisting of a complex polymer of gallactose and mannose was employed. In another case of carboxymethyl cellulose marketed under the name of Qualex Hi Vis CMC was used. In a still further operation Diacel LWL, which is carboxymethyl-hydroxyethyl cellulose was employed. This material is manufactured by Drilling Specialties, Inc.

The results of determining the filtration rates of these several compositions are compiled in the table and compared with the practice of the present invention.

Comparing the dextran and ferrochrome-lignosulfonate-containing composition with the other muds, it will be seen that the dextran is superior to the Driscose and is also superior to the sodium carboxymethyl cellulose. The present invention is also superior to the guar flour-containing composition and also to the compositions containing other filtration rate additives.

The present invention is quite advantageous and useful in that compositions and methods are provided for use in drilling operations, especially in wells where elevated temperatures are encountered.

The nature and objects of the present invention having been completely described and illustrated, what we wish to claim as new and useful and secure by Letters Patent is:

1. A composition suitable for use in wells which consists of a suspension of clay, an aqueous solution containing a water-soluble salt of an alkaline earth metal in a sufficient amount to provide in said composition an amount of alkaline earth metal ion of at least 1800 p.p.m. and sufficient amounts of ferrochrome-lignosulfonate and dextran to provide said composition with an API filtration rate less than about 20 ml., said composition having pH in the range from about 7.5 to about 10.0 and a density from about 8 to about 18 pounds per gallon, said composition being formed by adding said ferrochrome-lignosulfonate and said dextran to said suspension prior to addition of said water soluble salt.

2. A composition in accordance with claim 1 in which the alkaline earth metal is calcium.

3. A composition in accordance with claim 1 in which the alkaline earth metal is magnesium.

4. A composition in accordance with claim 1 in which the alkaline earth metal is barium.

5. A composition in accordance with claim 1 in which the alkaline earth metal is strontium.

6. A composition suitable for use in wells which consists of a suspension of clay, an aqueous solution containing a water-soluble salt of an alkaline earth metal in a sufficient amount to provide in said composition an amount of alkaline earth metal ion of at least 1800 p.p.m. and sufficient amounts within the range from about 5 to about 20 pounds per barrel and from about 1 to about 10 pounds per barrel, respectively, of ferrochrome-lignosulfonate and dextran to provide said composition with an API filtration rate less than about 20 ml., said composition having a pH in the range from about 7.5 to about 10.0 and a density from about 8 to about 18 pounds per gallon, said composition being formed by adding said ferrochrome-lignosulfonate and said dextran to said suspension prior to addition of said water soluble salt.

7. A composition suitable for use in wells which consists of a suspension of clay, an aqueous solution containing calcium chloride in a sufficient amount to provide in said composition an amount of calcium ion of at least 2000 p.p.m. and sufficient amounts of ferrochrome-lignosulfonate and dextran to provide said composition with an API filtration rate less than about 20 ml., said composition having a pH in the range from about 7.5 to about 10.0 and a density from about 8 to about 18 pounds per gallon, said composition being formed by adding said ferrochrome-lignosulfonate and said dextran to said suspension prior to addition of said calcium chloride.

8. A composition suitable for use in wells which consists of a suspension of clay, an aqueous solution containing a water-soluble salt of an alkaline earth metal in a sufficient amount to provide in said composition an amount of alkaline earth metal ion of at least 1800 p.p.m. and sufficient amounts of ferrochrome-lignosulfonate and dextran to provide said composition with an API filtration rate less than about 20 ml., said composition having a pH in the range from about 7.5 to about 10.0 and a density from about 8 to about 18 pounds per gallon, said ferrochrome-lignosulfonate and dextran being present in a ratio from about 5:1 to about 0.5:1, said composition being formed by adding said ferrochrome-lignosulfonate and said dextran to said suspension prior to addition of said water soluble salt.

9. A method for drilling a well which consists in forming a fluid comprising a suspension of clay, an aqueous solution containing a water-soluble salt of an alkaline earth metal in a sufficient amount to provide in said fluid an amount of alkaline earth metal ion of at least 1800 p.pm., and amounts of ferrochrome-lignosulfonate and dextran sufficient to provide said fluid with an API filtration rate of less than about 20 ml., said fluid being formed by adding said ferrochrome-lignosulfonate and said dextran to said suspension after said suspension has been formed and prior to addition of said water-soluble salt, said fluid having a pH within the range from about 7.5 to about 10 and a density within the range from about 8 to about 18 pounds per gallon, and introducing and circulating said fluid in said well while drilling said well at elevated well temperatures.

10. A method in accordance with claim 9 in which the alkaline earth metal is calcium.

11. A method in accordance with claim 9 in which the alkaline earth metal is barium.

12. A method in accordance with claim 9 in which the alkaline earth metal is magnesium.

13. A method in accordance with claim 9 in which the alkaline earth metal is strontium.

14. A method for drilling a well which consists in forming a fluid comprising a suspension of clay, an aqueous solution containing a water-soluble salt of an alkaline earth metal in a sufficient amount to provide in said fluid an amount of alkaline earth metal ion of at least 1800 p.p.m., and amounts within the range from about 5 to about 20 pounds per barrel and from about 1 to about 10 pounds per barrel, respectively, of ferrochrome-lignosulfonate and dextran sufficient to provide said fluid with an API filtration rate of less than about 20 ml., said fluid being formed by adding said ferrochrome-lignosulfonate and said dextran to said suspension after said suspension has been formed and prior to addition of said water-soluble salt, said fluid having a pH within the range from about 7.5 to about 10 and a density within the range from about 8 to about 18 pounds per gallon, and introducing and circulating said fluid in said well while drilling said well at elevated well temperatures.

15. A method for drilling a well which consists in forming a fluid comprising a suspension of clay, an aqueous solution containing calcium chloride in a sufficient amount to provide in said fluid an amount of calcium ion of at least 2000 p.p.m., and amounts of ferrochrome-lignosulfonate and dextran sufficient to provide said fluid with an API filtration rate of less than about 20 ml., said fluid being formed by adding said ferrochrome-lignosulfonate and said dextran to said suspension after said suspension has been formed and prior to addition of said calcium chloride, said fluid having a pH within the range from about 7.5 to about 10 and a density within the range from about 8 to about 18 pounds per gallon, and introducing and circulating said fluid in said well while drilling said well at elevated well temperatures.

16. A method for drilling a well which consists in forming a fluid comprising a suspension of clay, an aqueous solution containing a water-soluble salt of an alkaline earth metal in a sufficient amount to provide in said fluid an amount of alkaline earth metal ion of at least 1800 p.p.m., and amounts of ferrochrome-lignosulfonate and dextran sufficient to provide said fluid with an API filtration rate of less than about 20 ml., said fluid being formed by adding said ferrochrome-lignosulfonate and said dextran to said suspension after said suspension has been formed and prior to addition of said water-soluble salt, said fluid having a pH within the range from about 7.5 to about 10 and a density within the range from about 8 to about 18 pounds per gallon, and introducing and circulating said fluid in said well while drilling said well at elevated well temperatures, said ferrochrome-lignosulfonate and dextran being present in a ratio from about 5:1 to about 0.5:1.

References Cited in the file of this patent

UNITED STATES PATENTS

| | | |
|---|---|---|
| 2,360,327 | Bailey et al. | Oct. 17, 1944 |
| 2,371,955 | Dawson | Mar. 20, 1945 |
| 2,802,783 | Weiss et al. | Aug. 13, 1957 |
| 2,856,154 | Weiss et al. | Oct. 14, 1958 |
| 2,856,356 | Weiss et al. | Oct. 14, 1958 |
| 2,868,726 | Brukner et al. | Jan. 13, 1959 |
| 2,871,189 | Brukner | Jan. 27, 1959 |
| 2,935,473 | King et al. | May 3, 1960 |
| 2,935,504 | King et al. | May 3, 1960 |

OTHER REFERENCES

Rogers: Composition and Properties of Oil Well Drilling Fluids, pub. 1953 by Gulf Pub. Co. of Houston, Texas, pages 438 and 442 to 445.